United States Patent [19]

Oikari et al.

[11] Patent Number: 4,700,072

[45] Date of Patent: Oct. 13, 1987

[54] METHOD FOR DETERMINING COUNTING EFFICIENCY IN A LIQUID SCINTILLATION COUNTING SYSTEM

[75] Inventors: Timo E. T. Oikari; Kenneth C. A. Rundt, both of Turku, Finland

[73] Assignee: Wallac Oy, Turku, Finland

[21] Appl. No.: 747,281

[22] Filed: Jun. 21, 1985

[30] Foreign Application Priority Data

Aug. 31, 1984 [SE] Sweden .............................. 8404356

[51] Int. Cl.$^4$ ............................................. G01T 1/204
[52] U.S. Cl. .................................... 250/328; 250/369
[58] Field of Search ................................. 250/328, 369

[56] References Cited

U.S. PATENT DOCUMENTS 3,725,657 4/1973 Laney .................................. 250/71.5
4,085,325 4/1978 Atallah et al. ...................... 250/328
4,292,520 9/1981 Jordan ................................. 250/328

OTHER PUBLICATIONS

J. G. Ring et al., "Liquid Scintillation Counting, Recent Applications and Development", vol. 1, Ed. C-T. Peng, D. L. Horrock and E. L. Alpen, Academic Press, 1980, p. 89.
James F. Lang in "Organic Scintillators and Liquid Scintillation Counting", Ed. D. L. Horrocks and C. T. Peng, Academic Press, New York, 1971, p. 823.
M. Takieu, T. Natake, and M. Hayashi, Int. J. Appln. Rad. Isot., vol. 34, No. 10, 1983, p. 1483.
H. H. Ross, Analytical Chemistry, vol. 37, No. 4, p. 621, 1965.

Primary Examiner—Janice A. Howell
Assistant Examiner—David P. Porta
Attorney, Agent, or Firm—Fisher, Christen & Sabol

[57] ABSTRACT

Method to determine the degree of chemical quench and the degree of color quench in liquid scintillation samples in order to find the correct counting efficiency for the samples. Scintillation pulses produced by the liquid scintillation solution as a result of an isotopic decay or in response to radiation from an external $\gamma$-radiating source, are counted in a counter comprising two photodetectors working in coincidence, means for determining the value of one quench parameter dependent on the overall level of quench in the solution, and means for determining the value of another quench parameter predominantly dependent on the level of color quench in the solution. The counting efficiency for the sample can be determined on the basis of these two quench parameters.

3 Claims, 4 Drawing Figures

METHOD FOR DETERMINING COUNTING EFFICIENCY IN A LIQUID SCINTILLATION COUNTING SYSTEM

BACKGROUND OF THE INVENTION

1. FIELD OF THE INVENTION

The present invention relates generally to methods for determining the counting efficiency of a liquid scintillation sample with the aid of an experimentally determined quench function which gives the counting efficiency as a function of one, and only one measurable efficiency indicating parameter. More particularly, the invention defines an efficiency indicating parameter comprising two quench parameters and giving the same quench function for samples with arbitrary degrees of chemical and colour quench.

2. DESCRIPTION OF PRIOR ART

Liquid scintillation counting (LS counting) is a widely used method for determining the concentration of one or several radioactive isotopes in solution. This concentration is directly proportional to the decay rate (activity) of the isotope.

LS counting may in general be used to measure any radioactive isotope, but the $\beta$-radiating isotopes constitute the absolutely largest group, and within this group $^3H$ and $^{14}C$ are the two most commonly used isotopes. Most commercially available counters are built and programmed for these two isotopes. Tritium ($^3H$) is the $\beta$-radiating isotope which has the lowest decay energy, and is therefore critical to analyze as generally less than half of all decays can be detected.

The scintillation phenomenon is a result of excited organic molecules, originating in collisions between these molecules and a fast electron, ejected by the nucleus in the decay process. As the solvent in an LS system consists of easily excitable aromatic molecules, the excitation energy can move quite freely around until absorbed by a molecule (solute) which is quickly de-excited emitting a photon. As electron having an initial energy of a few kiloelectronvolts may excite and ionize several solvent molecules, but as a result of low efficiency of the scintillation processes and occurrence of many competing and quenching processes, the counting efficiency is always below 100%. Electrons of kinetic energies between zero and a maximum value are produced in radioactive decays. As the number of scintillation photons is proportional to the electron energy, each decay may result in a different number of photons. In commercial counters the photons are detected by a pair of photomultipliers, the output pulse amplitude of which is directly proportional to the number of scintillation photons. This leads to the characteristic $\beta$-decay pulse amplitude spectrum (distribution).

Quenching is a phenomenon whereby the number of scintillation photons per decay is decreased, resulting in lower counting efficiency. In principle, there are four different forms of quenching:

(i) absorption quenching which implies that part of the electron's kinetic energy is absorbed by some inert material such as tissue, filter paper or water droplets.

(ii) dilution quenching which implies that the electrons excite and ionize non-aromatic molecules such as secondary non-aromatic solvent molecules.

(iii) chemical quenching (excitation q., impurity q.) which implies that the excited aromatic molecules transfer their energy to other molecules which do not in turn transfer this energy further nor fluoresce.

(iv) colour quenching which implies that scintillation photons are absorbed by coloured substances (dyes).

In order to make the LS method work quantitatively, there must be ways to compensate for quenching, i.e. to determine the counting efficiency. As quenching varies from sample to sample, the counting efficiency must be determined for each sample, and this must be done automatically. There are different methods to do this, and they all rely on the effect of quenching on the position of the pulse amplitude spectrum with respect to a fixed point on the pulse amplitude scale. One can measure the shift in pulse amplitudes of either the spectrum resulting from the dissolved isotope, or the spectrum resulting from Compton electrons scattered by $\gamma$-rays originating in a radioactive isotope external to the scintillation solution. This isotope is called the 'external standard'.

A simple way to measure the pulse amplitude shift is to divide the pulse amplitude scale into two parts: part A consists of pulses greater than a certain value, and pulse B consists of pulses smaller than this value. The ratio between A and B (channels ratio) is a sensitive measure of the degree of quenching. If this ratio is measured for the isotope pulse amplitude distribution, the ratio is called 'Sample Channels Ratio', SCR. If an external standard is used, the ratio is usually called 'External Standard Channels Ratio', ESCR.

In most of the methods described above the pulses from both photomultipler tubes are summed prior to analysis. Laney has shown in U.S. Pat. No. 3,725,657 that it is favourable to use the lesser of the two pulses for quench analysis. If the summed pulse amplitude spectrum is used, then colour quenched samples are conferred to another quench function than the uncoloured, chemically quenched samples. This is shown graphically in FIG. 1 where the horizontal axis represents mean pulse amplitude of the Compton spectrum produced by a $^{226}Ra$ capsule beside the vial. In FIG. 1, curve 1 is valid for uncoloured samples quenched with carbon tetrachloride, and curve 2 is valid for coloured samples quenched with a yellow organic dye. Samples containing mixtures of both quenching agents would relate to one of an infinite number of curves between curves 1 and 2. Laney states in his patent mentioned above that by using the lesser pulse amplitude spectrum, the two curves 1 and 2 may be brought quite near each other or they might even unite to form only one curve. This last situation is most favourable in the case of a user who wants to count different types of samples with varying degrees of colour quench. This problem has been dealt with in many scientific papers in current literature. For example, H. H. Ross (Ross H. H., Analytical Chemistry, Vol. 37, No. 4, p. 621, 1965) has proposed a technique wherein the absorbance of the sample is determined by immersing a small glass ampoule containing an unquenched scintillation solution spiked with the desired isotope, into a given volume of uncoloured scintillation solution and into the coloured unknown sample. If the count rate produced by this ampoule is equal to $C_0$ in the first case and $C_1$ in the second case, the counting efficiency for the coloured sample is calculated by multiplying the counting efficiency derived from the quench function for uncoloured samples by the ratio $C_1/C_0$.

J. F. Lang in "Organic Scintillators and Liquid Scintillation Counting", Ed. D. L. Horrocks and C-T Peng, Academic Press, New York, 1971, p. 823 has proposed a method based on the count rate induced by the external standard together with ESCR. In this method four calibration equations are needed: these equations express the counting efficiency as a function of external standard count rate and as a function of ESCR for one set of purely chemically quenched standards and one set of purely colour quenched standards. For a sample which is purely chemically quenched, the two equations for the chemically quenched standards would give the same counting efficiency, while the two equations for the colour quenched standards would give two different values.

M. Takiue, T. Natake, and M. Hayashi, Int. J. Appl. Rad. Isot., Vol. 34 No. 10, 1983, p. 1483, have proposed a technique based on the two channel ratios SCR and ESCR. This method also requires two sets of quenched standards and will lead to four quench equations. The method is principally very similar to the previous method.

J. G. Ring, D. C. Nguyen, and L. J. Everett, in "Liquid Scintillation Counting, Recent Applications and Development", Vol. 1, Ed. C-T. Peng, D. L. Horrock and E. L. Alpen, Academic Press, 1980, p. 89, have proposed a method based on two parameters calculated from the external standard pulse amplitude spectrum. One parameter, called the quench index (QI), is proportional to the mean pulse amplitude, the other parameter, called the colour index (CI), is equal to the pulse amplitude, below which the integral number of pulses is a constant fraction of the total number of pulses in the spectrum. An example of such a parameter is the so called median which divides the spectrum into two parts having the same integrals. In this method two equations are needed: one expresses the counting efficiency of chemically quenched samples as a function of QI, the other expresses the ratio between the counting efficiency of a colour quenched sample and a chemically quenched sample as a function of both QI and CI. By applying these two quench equations the correct counting efficiency can always be determined.

3. Difficulties with Methods known in Prior Art

The method proposed by H. H. Ross is not applicable in an automatic LS counter as the sealed internal standard must be inserted and removed manually, and wiped carefully between two measurements. The counting time per sample is hence much prolonged.

The methods proposed by J. F. Lang, M. Takiue et al. and J. G. Ring et al. can all be applied in modern automatic counters. The method by Lang, however, is not as accurate as the two other methods as the external standard count rate is dependent on sample volume and the positioning of both the sample and the external standard. Moreover, both parameters are affected by the pulses produced in plastic vial walls as a consequence of solvent absorption into the vial wall. This "plastic wall effect" is quite small in case of freshly prepared samples, but may increase 100–200% during 24 hours.

The method by Takiue et al, is not as volume dependent as the method by Lang but still it is affected by the "plastic wall effect". It is also dependent on the homogeneity of the solution as heterogeneous solutions tend to give erroneous ESCR values. The method is valid only when isotope activity is high enough to render the SCR- value statistically reliable.

The method by J. G. Ring et al. is dependent on the scintillator volume and "plastic wall effect" through the colour index. The method is also profoundly affected by chemiluminescence in the scintillator solution as the CI is calculated using all pulses from zero amplitude upwards.

Further, the methods by Lang, Takiue et al. and Ring et al. require at least two series of quenched standards to be prepared by the user; one predominantly chemically quenched and one predominantly colour quenched. The user will have to manipulate twice or four times the number of quench functions compared to the case of an efficiency indicating parameter which results in one and the same quench function for chemically and colour quenched standards.

DESCRIPTION OF THE PREFERRED EMBODIMENTS

The general principle of the invention can be described as follows: Suppose two quench parameters P and R exist, of which P relates to overall quenching and R to colour quenching. In ideal cases these parameters are independent of the scintillator volume, plastic wall effect and chemiluminescence. There are now two different methods to calibrate the counter with known standards and to find the correct efficiency of any unknown sample. In the first method, which is similar to the method by J. G. Ring et al., calibration is performed by measuring a number of standards with purely chemical quench, a number of standards with purely colour quench and a number of standards with varying degrees of both chemical and colour quench. On the basis of these standards, it is possible to calculate two equations, of which $G(P)$ expresses the counting efficiency as a function of P only and $F(R,P)$, expresses the corrective factor by which the function $G(P)$ must be multiplied to give the correct counting efficiency:

$$ti\ E = F(R,P) \cdot G(P)$$

If $G(P)$ is equal to the chemical quench function, then $F(R,P)$ is equal to 1 for chemically quenched samples and typically smaller than 1 for colour quenched samples. Generally though, $G(P)$ may be the quench function for any set of standards, in which case $F(R,P)$ could obtain any value above zero. In order to define $F(R,P)$ with enough accuracy for every point on the R-P surface, it is necessary to use a vast number of standards when calibrating. Both $F(R,P)$ and $G(P)$ will depend on the part of the isotope pulse height spectrum that will be used for counting (the counting window).

From a user's point of view, it is more convenient to work with only one efficiency indicating parameter, which correlates chemically quenched and colour quenched samples to the same quench function. The other method described here to determine counting efficiency by using parameters P and R involves defining a new efficiency indicating parameter Q, which is a function of P and R;

$$1\ Q=H(P,R)$$

A simple example is to make Q a linear combination of P and R:

$$Q=P+k\cdot R$$

where the constant k is a positive or negative real number. The quench function now expresses the counting efficiency as a function of the parameter Q.

$$E=E(Q)$$

In this method the function H(P,R) may be predetermined and programmed at the factory, in which case only the quench function E(Q), which is dependent on isotope and count window, must be determined by the user.

Figure 2A:
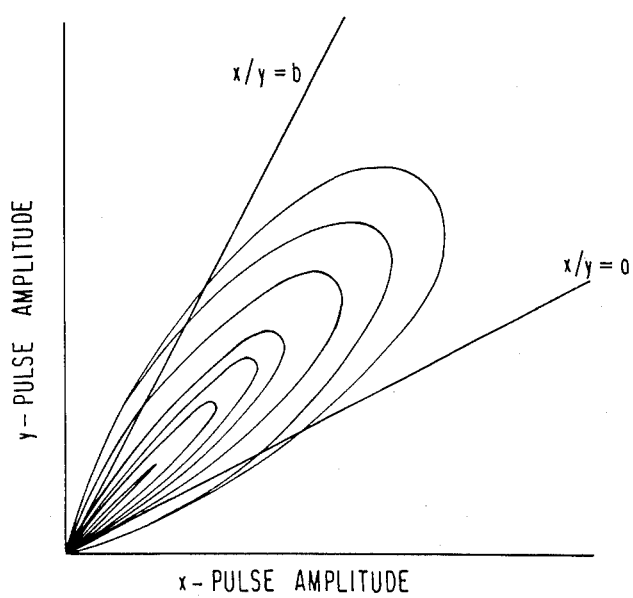
FIG. 2a is a pulse amplitude distribution for a chemically quenched solution.
Figure 2B:
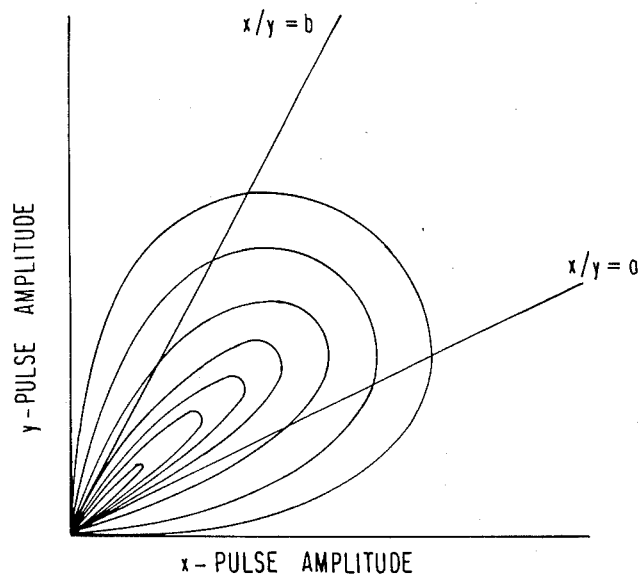
FIG. 2b is a pulse amplitude distribution for a colour quenched solution.

There are several candidates available for P and R. P may be equal to the mean pulse amplitude, a channels ratio, or the end point of the pulse amplitude spectrum. In order to understand the choice of R it is necessary to look at the difference between chemical quench and colour quench. Chemical quench involves quenching of the excited states of the solvent molecules and/or the fluorescing molecules. Hence, this quench mode is equal throughout the scintillation solution provided that it is homogeneous. Colour quench involves absorption of scintillation photons by coloured substances dissolved in the solution. As the probability that a photon will be absorbed in an exponential function of the distance traversed, this quench mode will be dependent on spatial coordinates. For example, a decay may result in 10 photons at a point quite near the vial wall, so that 5 of these immediately leave the vial to reach one of the two photomultipliers while 5 have to pass through the solution in order to reach the other photomultiplier. If the solution is uncoloured, the probability that the 5 photons traversing the vial will reach the photomultiplier is only slightly smaller than the probability that the other 5 photons will reach their photomultiplier. But, if the solution is coloured, the probability that all 5 photons will pass through the solution is quite small, the probability that 4 photons will pass is slightly higher, the probability that 3 photons will pass is still slightly higher and so on. This will result in a spread of the pulse amplitudes produced by the two photo-multipliers. This is illustrated in FIG. 2a and FIG. 2b. In these figures, the abscissa x represents the amplitudes of the pulses in one of the two photo-multiplier tubes in a traditional LS counter, while the ordinate y represents the amplitudes of the pulses in the other photomultiplier. The direction perpendicular to these two axes represents the relative number of coincident events detected, when a scintillation solution is irradiated by γ-rays from a $^{226}$Ra source. FIG. 2a shows the pulse amplitude distribution recorded from one solution which has been chemically quenched by adding a small amount of CCl$_4$, while FIG. 2b shows the pulse height distribution recorded from another solution which has been colour quenched by adding a small amount of colour. As can be seen in FIG. 2a and 2b, proportionally more pulse pairs with a pulse amplitude ratio x/y smaller than a value a (to the left from the vertical plane represented by x/y=a) or greater than a value b (to the right from the vertical plane represented by x/y=b), will be present in the coloured solution than in the uncoloured. Several quantities which will describe this phenomenon can be measured. The present invention comprises a quantity called the external standard pulse rate ratio. This quantity is determined by either (a) counting during a period of time, the number of coincident pulse pairs with pulse amplitudes x and y having a pulse amplitude ratio (x/y) such that a<(x/y)<b, and dividing this number by the total number of coincidence pulses, or by (b) counting during a period of time the number of coincident pulse pairs with pulse amplitudes x and y having a pulse amplitude ratio (x/y) such that (x/y)<a or (x/y)>b, and dividing this number by the total number of coincident pulses, or by (c) counting during a period of time the number of coincident pulse pairs with pulse amplitudes x and y having a pulse amplitude ratio x/y such that a <(x/y)<b, and dividing this number by the number of coincident pulse pairs having a pulse amplitude ratio (x/y) such that (x/y)<a or (x/y)>b.

In these definitions a and b may be any positive real numbers greater than zero. A method to distinguish between actual scintillation pulses and background pulses originating from cross-talk between the two photomultipliers, based on a principle similar to the one described above, has been patented by B. H. Laney in U.S. Pat. No. 3,781,544.

Figure 1:
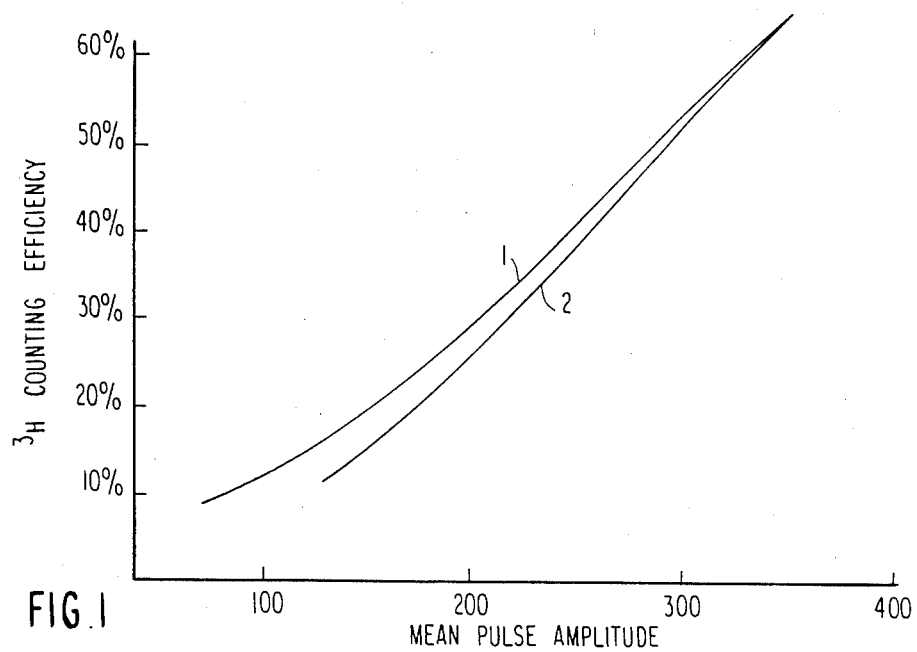
FIG. 1 is a diagram which illustrates the relationship between mean pulse amplitude and counting efficiency for various samples.
Figure 3:
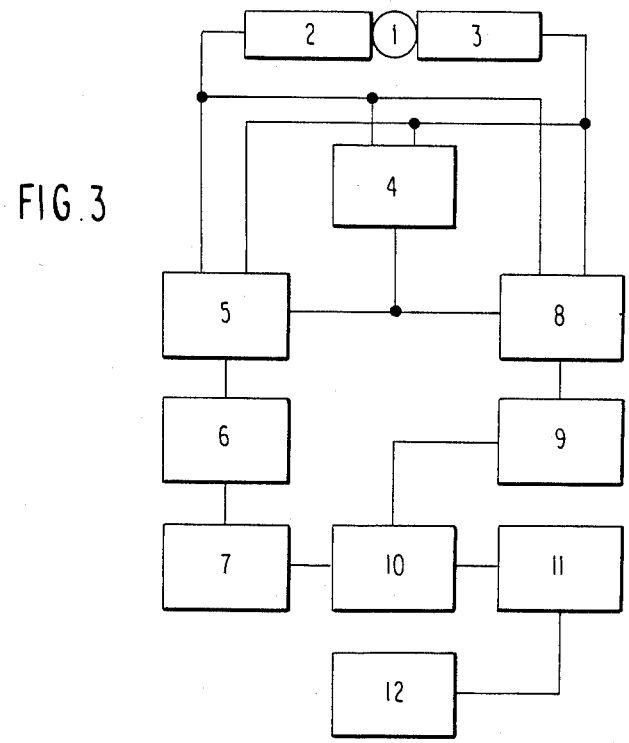
FIG. 3 is a schematical configuration of an LS counter for employing the method of this invention.

The quench parameter P, the parameter R in the form of mean pulse rate ratio and the quench index Q may be determined using an LS counter of a schematical configuration as in FIG. 3. The scintillation sample 1 generates photons which in turn generate pulses in the two photomultiplier tubes 2 (PMX) and 3 (PMY). The two pulses X and Y are led to a coincidence analyzer 4, a device 8, that sums the two pulses and passes them on provided that the analyzer 4 approves them, and to a device 5 that calculates the ratio between the amplitudes of the two pulses, and tests this ratio according to some criteria. The device 6 contains one register A and one register B. The device 5 increases either one or both registers A and B in device 6 by one for each coincident pulse pair, depending on which pulse amplitude ratio criterion was fulfilled in device 5. At the end of a measuring period, device 7 divides the number in register A by the number in register B and stores this ratio as the colour parameter R. The pulse sum x+y is passed on to the device 9 that calculates the quench parameter P in a manner known per se. The device 10 finally combines P and R to produce the efficiency parameter Q which is transferred to the communications device 11 to be used for further manipulations by the computer 12.

We claim:

1. Method for determining the counting efficiency of a liquid scintillation sample in a scintillation detecting and counting apparatus by:

identifying pulse pairs generated in a pair of photodetectors by scintillation photons caused by radioactive events as coincident pulse pairs by a coincidence analyzer;

adding together the amplitudes of the two pulses in each said pulse pair to produce a distribution of summed pulse amplitudes; and determining on the basis of said distribution a value for a first parameter, which is dependent on the overall quench level of said scintillation sample, characterized by:

determining the degree of color quench in said sample by measuring a value for a second parameter by counting the number of said pulse pairs having a pulse amplitude ratio greater than a first value and smaller than a second value, and dividing said number by the total number of coincident pulse pairs; and then calculating the counting efficiency by means of said values for said first and second parameters by using a quench function produced in advance by measuring chemically and color quenched standards having known counting efficiencies.

2. Method for determining the counting efficiency of a liquid scintillation sample in a scintillation detecting and counting apparatus, by:

identifying pulse pairs generated in a pair of photodetectors by scintillation photons caused by radioactive events as coincident pulse pairs by a coincidence analyzer;

adding together the amplitudes of the two pulses in each said pulse pair to produce a distribution of summed pulse amplitudes; and determining on the basis of said distribution a value for a first parameter, which is dependent on the overall quench level of said scintillation sample, characterized by:

determining the degree of color quench in said sample by measuring a value for a second parameter by counting the number of said pulse pairs having a pulse amplitude ratio smaller than a first value or greater than a second value, and dividing said number by the total number of coincident pulse pairs; and then calculating the counting efficiency by means of said values for said first and second parameters by using a quench function produced in advance by measuring chemically and color quenched standards having known counting efficiencies.

3. Method for determining the counting efficiency of a liquid scintillation sample in a scintillation detecting and counting apparatus, by:

identifying pulse pairs generated in a pair of photodetectors by scintillation photons caused by radioactive events as coincident pulse pairs by a coincidence analyzer;

adding together the amplitudes of the two pulses in each said pulse pair to produce a distribution of summed pulse amplitudes; and determining on the basis of said distribution a value for a first parameter, which is dependent on the overall quench level of said scintillation sample, characterized by:

determining the degree of color quench in said sample by measuring a value for a second parameter by counting the number of said pulse pairs having a pulse amplitude ratio greater than a first value and smaller than a second value, and dividing said number by the number of coincident pulse pairs having pulse amplitude ratios smaller than a third value or greater than a fourth value; and then calculating the counting efficiency by means of said values for said first and second parameters by using a quench function produced in advance by measuring chemically and color quenched standards having known counting efficiencies.

* * * * *